United States Patent [19]
Tunkel et al.

[11] Patent Number: 5,819,541
[45] Date of Patent: Oct. 13, 1998

[54] METHOD OF BEVERAGE COOLING/ HEATING ON VEHICLES

[75] Inventors: Lev Tunkel, Edison, N.J.; Boris Krasovitski, Nesher, Israel; Robert L. Foster, Manasquan, N.J.

[73] Assignee: Universal Vortex, Inc., Robbinsville, N.J.

[21] Appl. No.: 831,126

[22] Filed: Apr. 1, 1997

[51] Int. Cl.$^6$ .................................... F25B 9/02
[52] U.S. Cl. .................................... 62/5; 62/244
[58] Field of Search .................... 62/5, 239, 244, 62/371, 457.9

[56] References Cited

U.S. PATENT DOCUMENTS

| | | | |
|---|---|---|---|
| 3,630,040 | 12/1971 | Goldfarb | 62/5 |
| 4,594,084 | 6/1986 | Lopez | 62/5 |
| 4,759,190 | 7/1988 | Trachtenberg et al. | 62/3.6 |
| 5,203,833 | 4/1993 | Howell | 165/41 |
| 5,561,982 | 10/1996 | Tunkel et al. | 62/5 |

*Primary Examiner*—William Doerrler
*Attorney, Agent, or Firm*—McAulay Nissen Goldberg Kiel & Hand, LLP

[57] ABSTRACT

Portable heating/cooling systems for effecting a temperature change of beverages to be installed on vehicles with an abundance of compressed air and/or with an internal combustion engine, which include connecting a vortex tube inlet tube through an inlet cut out cock with a vehicle's compressed air receiver which is connected to the compressor, connecting the vortex tube cold fraction discharge line through the cold fraction cut out cock with the beverage can holder and further with atmosphere, while maintaining the cold fraction cut out relieve cock closed, and connecting the vortex tube hot fraction discharge line through the hot fraction cut out relieve cock with the atmosphere, while maintaining a hot fraction cut out cock closed.

3 Claims, 1 Drawing Sheet

METHOD OF BEVERAGE COOLING/HEATING ON VEHICLES

BACKGROUND OF THE INVENTION FIELD OF INVENTION

The present invention relates to portable heating/cooling systems for effecting a temperature change of beverages to be installed on vehicles with an abundance of compressed air and/or with an internal combustion engine.

DESCRIPTION OF THE PRIOR ART

The contemporary concept of portable beverage/food cooling/heating systems falls into five groups which are based on the utilized source of the primary energy. These groups are: chemical reactions, conventional refrigeration, absorption, electricity and compressed air.

The four first-mentioned features were discussed in U.S. Pat. No. 5,331,817. It was then suggested that the fifth feature, compressed air, as a feed for the vortex tube creates a saving and an economically acceptable alternative for the above mentioned sources of energy. In accordance with this suggestion, a vortex tube based beverage/food cooling/heating design was introduced.

In a vortex tube, as it is generally known, initial compressed gas flow is transformed into two separate currents of different energy (a cold fraction and a hot fraction) leaving the vortex tube separately under pressure which is less then the inlet pressure but at a pressure still above atmospheric.

A vortex tube comprises a slender tube with a diaphragm closing one end of the tube provided with a hole in the center of the diaphragm for discharge of the cold fraction, one or more tangential inlet nozzles piercing the tube just inside of the diaphragm, and a controlled hot fraction discharge opening such as a throttle valve or any other restrictive body at the far end or the other end of the slender tube.

Even today, the full theory of the vortex tube, explaining all its features, has not yet been created or established. However, the principal mechanism of the vortex phenomenon can be described in the following manner. An expanding gas after passing the tangential nozzle develops into a high speed rotating body, a vortex. The gas in the vortex is cooled because part of its total energy converts into kinetic energy. An angular velocity in the vortex is low at the periphery zone and very high toward the center zone. Friction between the central and periphery zones reduces all of the gas to the same angular velocity as is in a solid body. This causes the inner layers to slow down and the outer layers to speed up. As a result, the inner layers lose part of their kinetic energy and their total temperature decreases. The periphery layers receive the energy from the internal layers. This energy converts to heat through friction in the 'hot' end of the tube.

Having a vortex tube as a cooling/heating means, the design disclosed in the U.S. Pat. No. 5,331,817 requires, however, an incorporation into the beverage can of a canister containing a gas compressed to 300–700 psi. to be used as a vortex tube feedstock. Such requirement generally makes the system dependable on the outer source of the compressed gas let alone a user's necessity to operate a pressure vessel.

It therefore an object of this invention to develop the vortex tube based beverage cooling/heating system for the vehicles, in particular, with a vortex tube's feedstock appearing as an outcome of the vehicle's normal performance.

Generally, there are two sources of the airflow available on contemporary vehicles during its normal performance: a compressed air supplying by an 'onboard' compressor in order to operate a brake system and/or a vacuumed air running through a combustion engine's intake manifold.

At this point, a vortex tube design as set forth in U.S. Pat. No. 5,327,728 to Tunkel and a vacuum vortex tube as set forth in U.S. Pat. No. 5,561,982 to Tunkel and Krasovitski are particularly useful in connection with this invention.

The latest of those patents is concerned with a novel method of energy separation and utilization of such energy separated in the vortex tube which operates with a pressure not exceeding atmospheric pressure. This method is to be carried out with a source of vacuum, a vortex tube and at least one heat exchanger. Accordingly, the vortex tube's nozzles are connected with an inlet gas flow having a pressure not exceeding atmospheric pressure, and the vortex tube's diaphragm with the hole for discharging the cold stream is connected through a heat exchanger provided to utilize a cold duty with the source of vacuum and, accordingly, the vortex tube's throttle valve or any other restrictive body for discharging of the hot stream at the opposite end of the slender tube is connected through the heat exchanger provided to utilize a hot duty with the source of vacuum.

SUMMARY OF THE INVENTION

To this end, the present invention consist in the provision of a method for the design and production of a vortex tube's based beverage cooling/heating system to be installed on the vehicle with an abundance of the compressed air and/or with an internal combustion engine, with a vortex tube's feedstock appearing as an outcome of the vehicle performance. The system according to the invention comprises either a vortex tube with its inlet connected with a receiver of the compressed air used to power vehicle's brake system, or a vacuum vortex tube with its inlet open to atmospheric air, with a vortex cold/hot fraction outlet connected with the beverage can holder inlet and with the beverage can holder outlet connected with an atmospheric air or, in case of a vacuum operations, with an engine's intake air manifold.

Specifically, the invention is concerned with a method for effecting a temperature change of an object to be installed on vehicles in a system including a vehicle's air compressor and a vehicle's compressed air receiver, an inlet cut out cock, a vortex tube, a cold fraction cut out cock and a cold fraction relieve cut out cock, a hot fraction cut out cock and a hot fraction relieve cut out cock and an object holder, the method providing of the object cooling, comprising the steps of connecting the vortex tube inlet through the inlet cut out cock with the vehicle's compressed air receiver which is connected to the compressor; connecting the vortex tube cold fraction discharge line through the cold fraction cut out cock with the beverage can holder and further with atmosphere, while maintaining the cold fraction cut out relieve cock closed; and connecting the vortex tube hot fraction discharge line through the hot fraction cut out relieve cock with the atmosphere, while maintaining a hot fraction cut out cock closed.

The invention is also concerned with effecting a temperature change of a beverage in a system including a vehicle's air compressor and a vehicle's compressed air receiver an inlet cut out cock, a vortex tube and a beverage can holder with a compartment for the beverage can to be cooled and for beverage can to be heated, and provides for a method of cooling of one can and simultaneously heating another, by connecting a vortex tube inlet through the inlet cut out cock with the vehicle's compressed air receiver which is connected to the compressor, connecting the vortex tube cold fraction discharge line with the beverage can holder's compartment for the can to be cooled and further with atmosphere, and connecting the vortex tube hot fraction discharge line with the beverage can holder's compartment for can to be heated and further with the atmosphere.

The invention is further concerned with a method for changing temperature of a beverage on vehicles in a system including a vacuum vortex tube, a cold fraction cut out cock and a cold fraction relieve cut out cock, a hot fraction cut out cock and a hot fraction relieve cut out cock, a beverage can holder, an operational cut out cock and a relieve cut out cock and a vehicle combustion engine, the method providing beverage cooling, comprising the steps of connecting a vacuum vortex tube inlet with atmospheric air, connecting the vacuum vortex tube cold fraction discharge line through the cold fraction cut out cock with the beverage can holder and further through an operational cut out cock with the combustion section of the vehicle engine, while maintaining the cold fraction cut out relieve cock closed, connecting the vacuum vortex tube hot fraction discharge line through the hot fraction relieve cut out cock and further through an operational cut out cock with the combustion section of the vehicle engine, while maintaining the hot fraction cut out cock closed, and maintaining a relieve cut out cock closed.

The invention also provides for another method for cooling/heating a beverage on a vehicle in a system including a vacuum vortex tube, a beverage can holder with a compartment for the beverage can to be cooled and a compartment for the beverage can to be heated, an operational cut out cock, relieve cut out cock and a vehicle combustion engine, the method providing a beverage cooling heating, comprising the steps of connecting the vacuum vortex tube inlet with atmospheric air, connecting the vacuum vortex tube cold fraction discharge line with a beverage's can holder compartment for the beverage can to be cooled and further through an operational cut out cock with the combustion section of the vehicle engine, connecting the vacuum vortex tube hot fraction discharge line with the beverage's can holder compartment for the can to be heated and further through the operational cut out cock with the combustion section of the vehicle engine, and maintaining the relieve cut out cock closed.

BRIEF DESCRIPTION OF THE DRAWINGS In the drawings.

DETAILED DESCRIPTION OF THE PREFERRED EMBODIMENT

Figure 1:
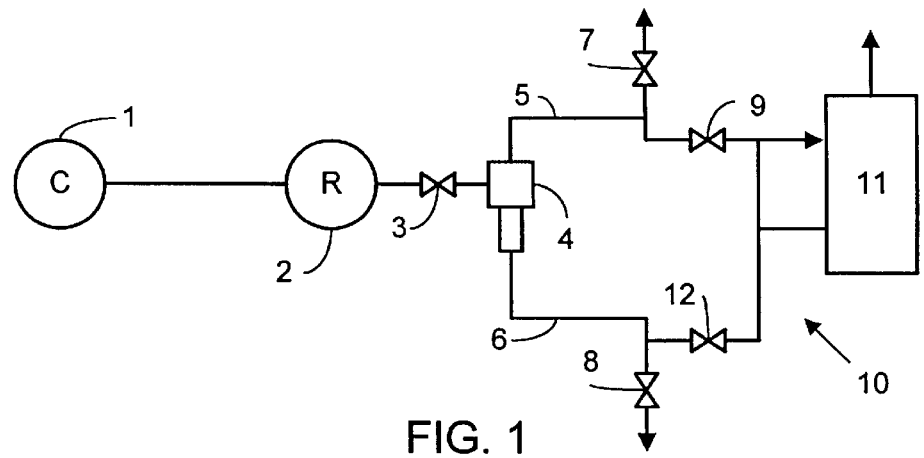
FIG. 1 is a schematic design and flow diagram of one embodiment of the invention.

Referring now more particularly to the accompanying drawing and in particular to the schematic design and flow diagram of FIG. 1 which illustrates one embodiment of the invention, a beverage cooling/heating system 10 according to invention includes an 'onboard' air compressor 1, 'onboard' receiver for the compressed air 2, an inlet cut out cock 3, a vortex tube 4, the cold fraction relieve cut out cock 7, the cold fraction cut out cock 9, the hot fraction relieve cut out cock 8, the hot fraction cut out cock 12 and a beverage can holder 11. Line 5 connects vortex tube 4 to cold fraction relieve cut out cock 7 and cold fraction cut out cock 9, and line 6 connects vortex tube 4 to hot fraction relieve cut out cock 8 and hot fraction cut out cock 12.

The function of the can holder is to provide an efficient heat transfer between gas discharged from the vortex tube and liquid in the can. Those skilled in the art will assume that any approach serving this function would be appropriate in the can holder design.

Another function of the can holder is to provide an easy access to the beverage can when there is a need to consume the liquid. Again, there are many ways to secure this function in the can holder design. One of them is a removable lid locked to the can holder body.

Pressurized air supplied from compressor 1 enters receiver 2 where a portion of the air is then directed through cut out cock 3 to vortex tube 4. A cold fraction is discharged from vortex tube 4 into line 5 and then, under system's cooling mode of operation enters a beverage can holder through cut out cock 9, while a relieve cut out cock 7 is kept closed. After transferring its cooling duty to the beverage in the can, the cold fraction is then directed into atmosphere. Accordingly, a hot fraction is discharged from the vortex tube 4 into line 6 and then into the atmosphere through relieve cut out cock 8, while cut out cock 12 is kept closed.

Under the system's heating mode of operation, a hot fraction enters a beverage can holder through a cut out cock 12, while relieve cut out cock 8 is kept closed. After transfering its heating duty to the beverage in the can, the hot fraction is then directed into atmosphere. Accordingly, a cold fraction is discharged into that atmosphere through a relieve cut out cock 7, while cut out cock 9 is kept closed.

Figure 2:
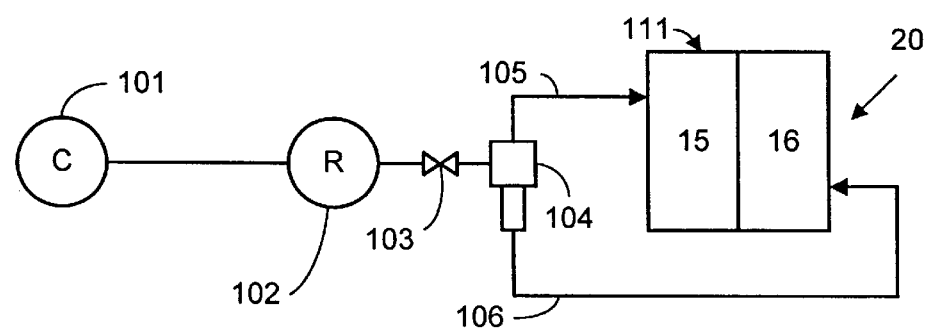
FIG. 2 is a schematic design and flow diagram of another embodiment of the invention.

Another embodiment of the present invention, which provides for the cooling of can of beverage and simultaneously provides for the heating of another, is shown in FIG. 2. In this embodiment, parts similar to the parts in FIG. 1 have been raised by 100. As shown on the schematic design and flow diagram of FIG. 2 a beverage cooling/heating system 20 according to invention includes an 'onboard' air compressor 101, 'onboard' receiver for the compressed air 102, an inlet cut out cock 103, a vortex tube 104 and a beverage can holder 111 with compartment 15 for the can to be cooled and compartment 16 for the can to be heated. Pressurized air from the compressor 101 enters receiver 102, at which point, portion of the air is then directed through a cut out cock 103 to vortex tube 104. A cold fraction is discharged from vortex tube 104 into line 105 and then enters cooling compartment 15 of the beverage can holder 111. After transferring its cooling duty to the beverage in the can in compartment 15, the cold fraction is then directed into the atmosphere. Accordingly, a hot fraction is discharged from the vortex tube 104 into line 106 and then enters a heating compartment 16 of the beverage can holder 111. After transferring its heating duty to the beverage in the can, the hot fraction then directed into the atmosphere.

Figure 3:
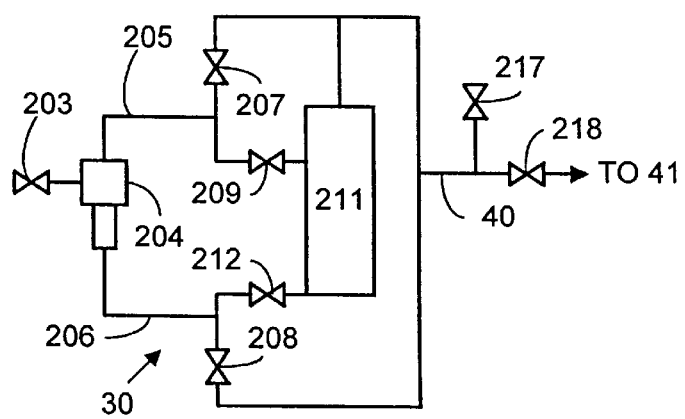
FIG. 3 is a schematic design and flow diagram of another embodiment of the invention.

Another embodiment of the present invention with a vacuumed air as a vortex tube feedstock is shown in FIG. 3. In this embodiment, parts similar to the parts in FIG. 1 have been raised by 200. As shown on the schematic design and flow diagram of FIG. 3, beverage cooling/heating system 30 according to invention includes a vacuum vortex tube 204, cold fraction relieve cut out cock 207 and cold fraction cut out cock 209, hot fraction relieve cut out cock 208 and hot fraction cut out cock 212, beverage can holder 211 relieve cut out cock 217, operational cut out cock 218 and the vehicle combustion engine.

Atmospheric air is directed through a vacuum vortex tube 204 due to the vacuum created in the combustion engine. A cold fraction is discharged from the vortex tube 204 into vacuumed line 205 and then under the system's cooling mode of operation enters vacuumed beverage can holder 211 through cut out cock 209, while relieve cut out cock 207 is kept closed. After transferring its cooling duty to the beverage in the can, the cold fraction then through the vacuumed line 40 and cut out cock 218 is directed into the suction section of the combustion engine 41. Accordingly, a hot fraction is discharged from the vortex tube 204 into the vacuumed line 206 and then through relieve cut out cock 208 into the vacuumed line 40 and cut out cock 218 to the suction section of the combustion engine 41,while cut out cock 212 is kept closed.

Under the system's heating mode of operation, a hot fraction enters a vacuumed beverage can holder 211 through cut out cock 212, while relieve cut out cock 208 is kept closed. After transferring its heating duty to the beverage in the can, the hot fraction is then transferred through the vacuumed line 40 and through cut out cock 218 and is then directed into a suction section (schematically shown) of the combustion engine 41. Accordingly, a cold fraction is discharged from the vortex tube 204 into the vacuumed line 205 and then through a relieve cut out cock 207 into the vacuumed line 40 and through cut out cock 218 to the suction section of the combustion engine 41,while a cut out cock 209 is kept closed. During the vacuum operations relieve cut out cock 217 is constantly kept closed.

However, while loading or unloading a beverage can, cut out cock 217 is open and an operational cut out cock 218 is closed. That provides a can holder disconnection from the source of vacuum.

Figure 4:
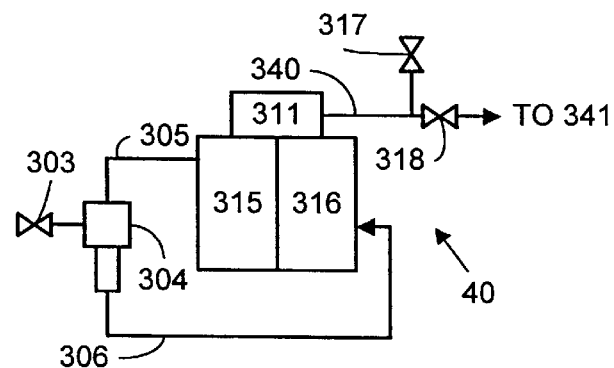
FIG. 4 is a schematic design and flow diagram of another embodiment of the invention.

Another embodiment of the present invention, which provides for a cooling of one can of beverage and simultaneously a heating of another, with a vacuumed air as a vortex tube feedstock is shown in FIG. 4. In this embodiment, parts similar to the parts in FIG. 1 have been raised by 300. As shown on the schematic design and flow diagram of FIG. 4, a beverage cooling/heating system 40 according to invention includes, a vortex tube 304, a beverage can holder 311 with compartment 315 for the can to be cooled and compartment 316 for the can to be heated, a relieve cut out cock 317, an operational cut out cock 318 and the vehicle combustion engine. Atmospheric air is directed through vacuum vortex tube 304 due to the vacuum created in the combustion engine. A cold fraction is discharged from the vortex tube 304 into vacuumed line 305 then enters a cooling compartment 315 of the vacuumed beverage can holder 311. After transferring its cooling duty to the beverage in the can, the cold fraction is then directed through the vacuumed line 340 and operational cut out cock 318 to the suction section of the combustion engine 341. Accordingly, a hot fraction is discharged from the vortex tube 304 into vacuumed line 306 then enters a heating compartment 316 of the vacuumed beverage can holder 311. After transferring its heating duty to the beverage in the can, the hot fraction is then directed through the vacuumed line 340 and operational cut out cock 318 into the suction section of the combustion engine 341.

During the vacuum operations, a relieve cut out cock 317 is constantly kept closed. However, while loading or unloading a beverage can, a cut out cock 317 is open and a cut out cock 318 is closed. That provides a can holder disconnection from the source of vacuum. It should be understood that a can holder operating under vacuum must have a design means allowing to cover a can opening in order to prevent the liquid evaporation by boiling. It may be achieved, for example, by shaping the central part of the holder lid in the form of the standard 16 oz. can flat top.

While there is shown and described what is considered to be the preferred embodiments of the invention, it will be understood by those skilled in the art that various changes and modifications may be made therein without departing from the scope of the invention.

What is claimed is:

1. A method for effecting a temperature change of beverages to be installed on the vehicles in a system including a vehicle's air compressor and a vehicle's compressed air receiver, an inlet cut out cock, a vortex tube, a cold fraction cut out cock and a cold fraction relieve cut out cock, a hot fraction cut out cock and a hot fraction relieve cut out cock and a beverage can holder, the method providing a beverage cooling, comprising the steps of:

a) connecting the vortex tube inlet through the inlet cut out cock with the vehicle's compressed air receiver which is connected to the compressor;

b) connecting the vortex tube cold fraction discharge line through the cold fraction cut out cock with the beverage can holder and further with atmosphere, while maintaining the cold fraction cut out relieve cock closed; and c) connecting the vortex tube hot fraction discharge line through the hot fraction cut out relieve cock with the atmosphere, while maintaining a hot fraction cut out cock closed.

2. The method of claim 1 for providing beverage heating, comprising:

a) connecting the vortex tube inlet through the inlet cut out cock with the vehicle's compressed air receiver which is connected to the compressor;

b) connecting the vortex tube hot fraction discharge line through the hot fraction cut out cock with the beverage can holder and further with atmosphere, while maintaining the hot fraction cut out relieve cock closed; and c) connecting the vortex tube cold fraction discharge line through the cold fraction cut out relieve cock with the atmosphere, while maintaining the cold fraction cut out cock closed.

3. A method of a beverage cooling/heating on the vehicles in a system including a vehicle's air compressor and a vehicle's compressed air receiver an inlet cut out cock,a vortex tube and a beverage can holder with a compartment for the beverage can to be cooled and for beverage can to be heated, the method providing for cooling of one can and simultaneously heating another, comprising the steps of:

a) connecting a vortex tube inlet through the inlet cut out cock with the vehicle's compressed air receiver which is connected to the compressor;

b) connecting the vortex tube cold fraction discharge line with the beverage can holder's compartment for the can to be cooled and further with atmosphere; and c) connecting the vortex tube hot fraction discharge line with the beverage can holder's compartment for can to be heated and further with the atmosphere.

* * * * *